(12) United States Patent
Øigarden

(10) Patent No.: US 7,759,814 B2
(45) Date of Patent: Jul. 20, 2010

(54) DEVICE FOR CONVERTING WAVE ENERGY

(75) Inventor: Hans Øigarden, Oslo (NO)

(73) Assignee: Fobox AS, Oslo (NO)

( * ) Notice: Subject to any disclaimer, the term of this patent is extended or adjusted under 35 U.S.C. 154(b) by 0 days.

(21) Appl. No.: 12/302,874

(22) PCT Filed: May 31, 2007

(86) PCT No.: PCT/NO2007/000192

§ 371 (c)(1),
(2), (4) Date: Jan. 16, 2009

(87) PCT Pub. No.: WO2007/139396

PCT Pub. Date: Dec. 6, 2007

(65) Prior Publication Data

US 2009/0224548 A1 Sep. 10, 2009

(30) Foreign Application Priority Data

May 31, 2006 (NO) .................................. 20062486

(51) Int. Cl.
*F03B 13/10* (2006.01)
(52) U.S. Cl. .......................................................... 290/53
(58) Field of Classification Search .................. 290/53; 60/507, 398, 504, 498, 501, 496, 595; 405/76
See application file for complete search history.

(56) References Cited

U.S. PATENT DOCUMENTS

| | | |
|---|---|---|
| 415,812 A | 11/1889 | Dowe |
| 607,072 A | 7/1898 | Palmer |
| 978,628 A | 12/1910 | Nixon |
| 1,403,702 A | 1/1922 | Melvin |
| 3,777,494 A | 12/1973 | Soderlund |
| 4,355,511 A * | 10/1982 | Jones ........................... 60/507 |
| 6,256,985 B1 | 7/2001 | Gardner et al. |
| 6,256,987 B1 | 7/2001 | Stolle |
| 6,739,804 B1 * | 5/2004 | Haun ....................... 405/195.1 |
| 7,585,131 B2 * | 9/2009 | Oigarden et al. .............. 405/76 |
| 7,628,206 B2 * | 12/2009 | Bhat et al. .................. 166/355 |

FOREIGN PATENT DOCUMENTS

| | | |
|---|---|---|
| ES | 2 193 821 A1 | 11/2003 |
| FR | 2543619 | 10/1984 |
| JP | 58197474 A | 11/1983 |
| WO | WO-2004/113718 A1 | 12/2004 |

* cited by examiner

*Primary Examiner*—T C Patel
*Assistant Examiner*—Iraj A Mohandesi
(74) *Attorney, Agent, or Firm*—Birch, Stewart, Kolasch & Birch, LLP

(57) ABSTRACT

Device for absorption of wave energy, comprising a floating body (2) adapted to move as a result of influence from waves, and energy transmission means transmitting movement of the floating body to a generator, characterized by that it further comprises an immersed vessel (32), the upper part thereof containing gas and lower part thereof containing water, where the interior of the vessel (32) has pressure communication with the surrounding water, so that the volume of the gas in the vessel (32) depends on the pressure surrounding the vessel and thus affects the weight of the vessel (32) and its contents, the vessel (32) having such a connection to the rest of the device that it moves mainly vertically and in anti-phase in relation to the vertical movement of the floating body (2) when waves moves past the device, where the vessel (32) is connected to energy transmitting means for transmitting its movement to a generator.

20 Claims, 9 Drawing Sheets

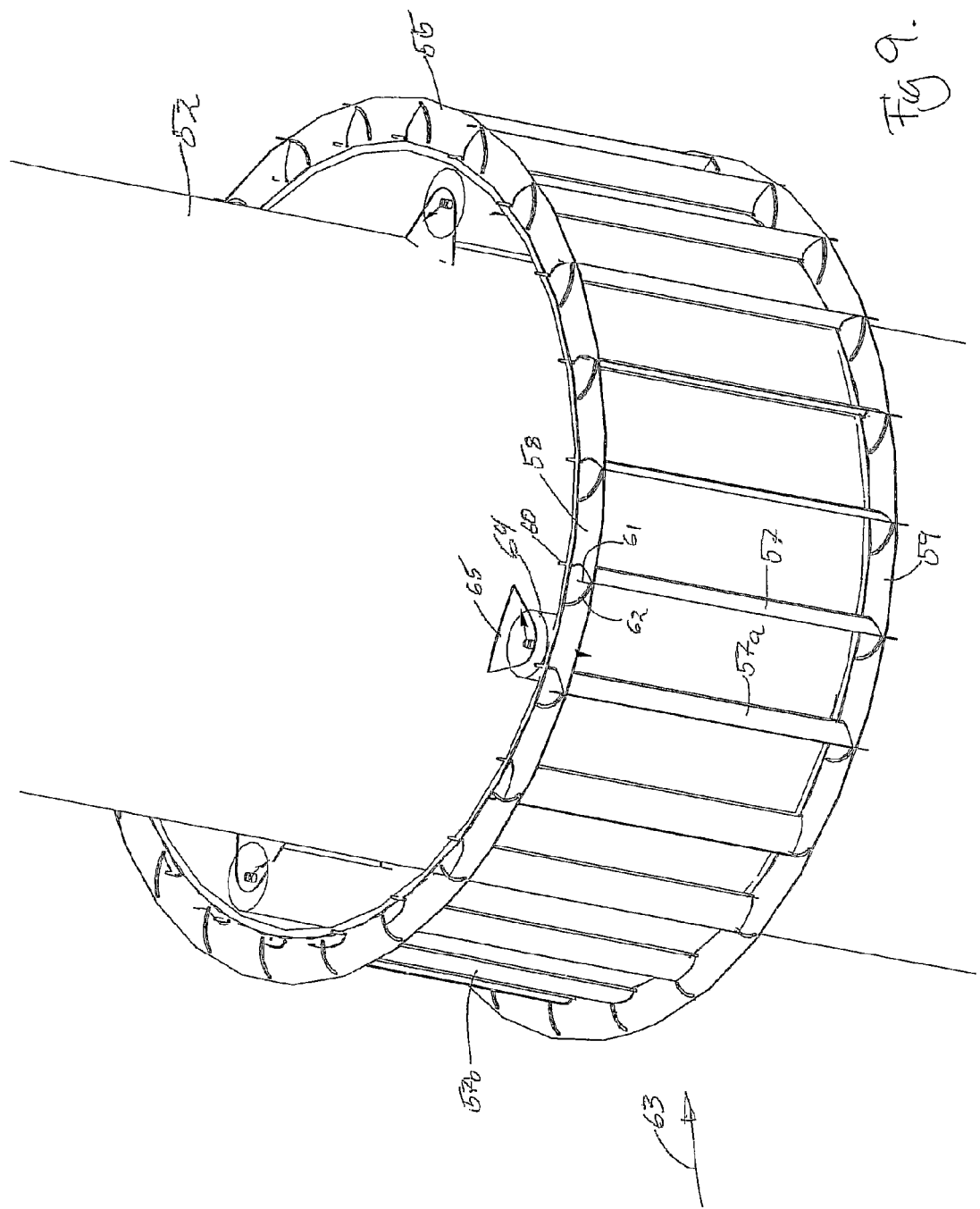

DEVICE FOR CONVERTING WAVE ENERGY

Figure 1:
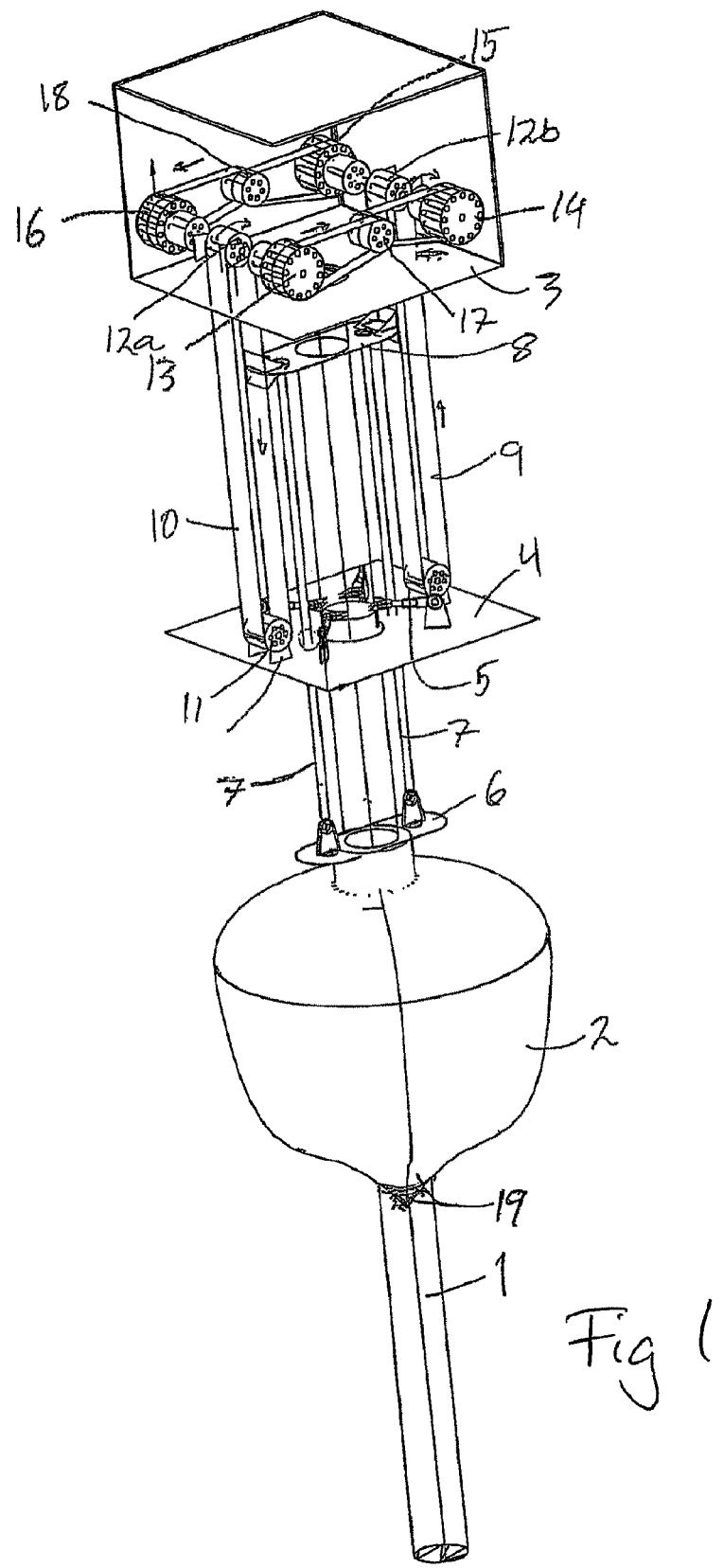

The present invention relates to a device for absorption of wave energy according to the ingress of the following claim 1.

Such a device is known from the applicants own Norwegian patent application no. 2003 2883. In this application a device for use in a wave powered generator is described. The device comprises a floating body arranged to float in or near the surface of the water. A piston rod extends from the floating body to a cylinder, which in turn is clamped in a fixture. This fixture is placed on a floater.

Additionally, from the applicants own PCT-application WO 2004/113718 it is known a platform construction equipped with devices for absorption of wave energy of the above mentioned type. This application is hereby incorporated by reference. The platform construction consists generally of a platform above water and a number, for example four, of legs extending down in the water and that has sufficient buoyancy to hold the platform stable above water.

A test platform ("Buldra") according to the principles in FIG. 10 in WO 2004/113718 was built in the last half of 2004 and was first used in February 2005. This turned out to work in a satisfactory way. Work has been done on several improvements of the devices that absorb wave energy and the platform construction itself based on the test results that are produced by the testing of "Buldra". The present invention relates to some of these improvements and is particularly aimed at the energy transmission means.

Another known solution for wave powered generators is disclosed in U.S. Pat. No. 6,256,987 where a number of units placed on the bottom of shallow water is described. Every unit comprises a hood arranged to move vertical in relation to a frame. The interior of the hood is filled with gas. When waves pass over the unit the hood will move up and down according to the waves, i.e. the hood moves upwards when a trough of wave passes and it will move downwards when a wave crest passes. The lower part of the unit is filled with water. This water volume can be varied and suppress gas so that the gas volume and thereby resonant frequency can be adapted to the wave frequency.

The largest disadvantage of this solution is that it must be placed on the bottom of the sea. Thereby one gets difficult access to the units for maintenance and repair. The units must in addition be placed on shallow water and will therefore constitute danger to ships and fishery.

It is an object of the present invention to provide a more effective device for absorption of wave energy, comprising a floating body arranged to move as a result of influence from waves, and energy transmission means transmitting the movements of the floating body to a generator, characterized by that it further comprises an immersed vessel, the upper part thereof containing gas and lower part thereof containing water, where the interior of the vessel has pressure communication with the surrounding water, so that the volume of the gas in the vessel depends on the pressure surrounding the vessel and thus affects the weight of the vessel and its contents, the vessel having such a connection to the rest of the device that it moves mainly vertically and in anti-phase in relation to the vertical movement of the floating body when waves move past the device, where the vessel is connected to energy transmission means for transmitting its movement to a generator.

Additional advantageous embodiments of the invention are further disclosed in the dependent claims.

Figure 2:
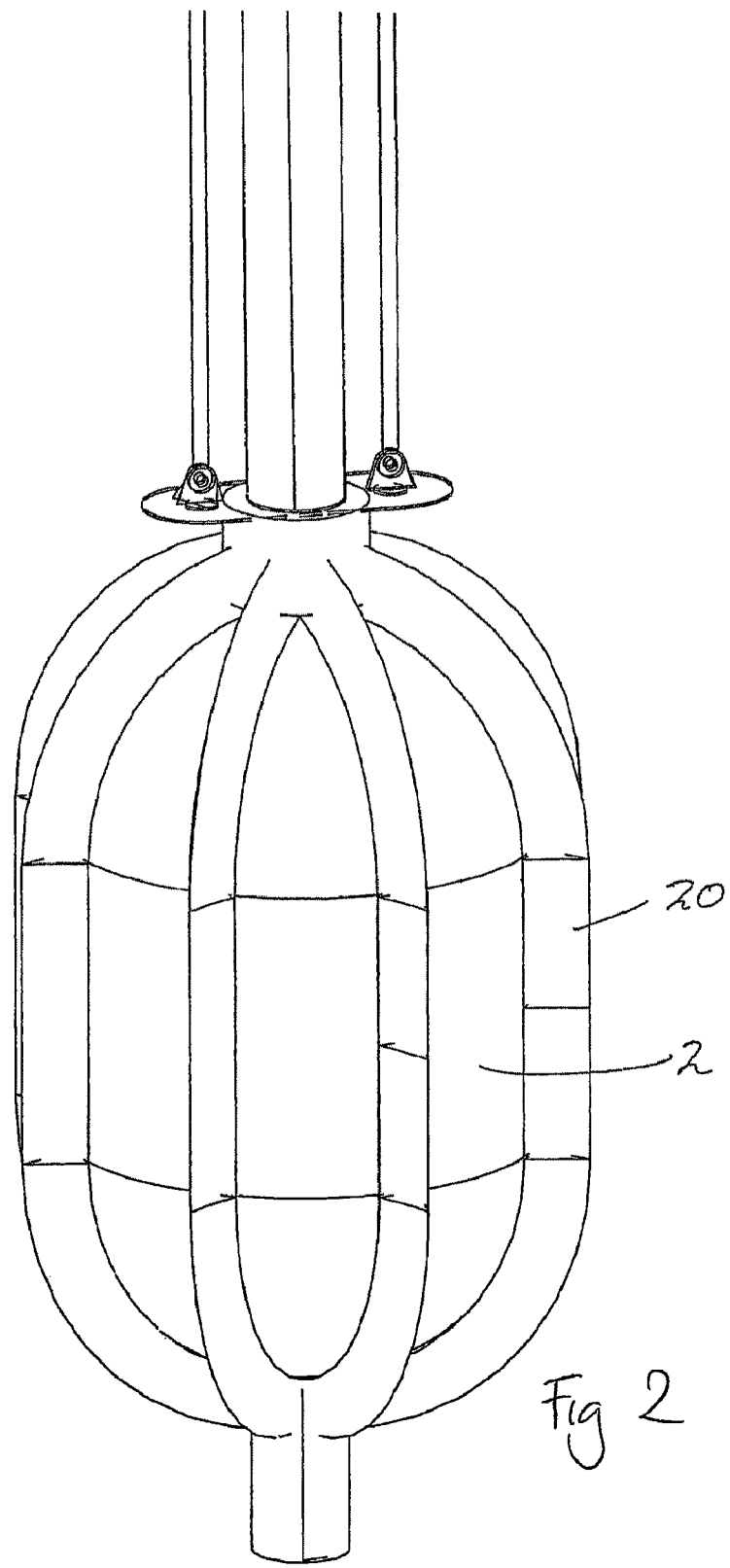
Figure 3:
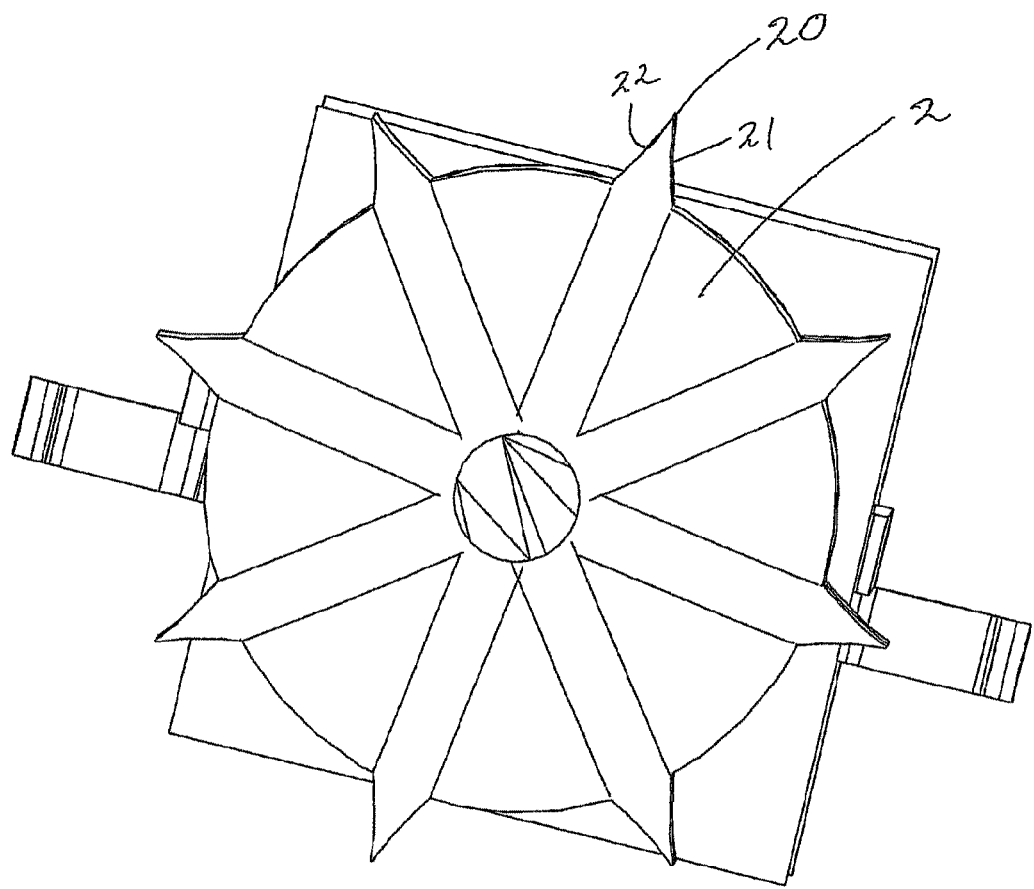
Figure 4:
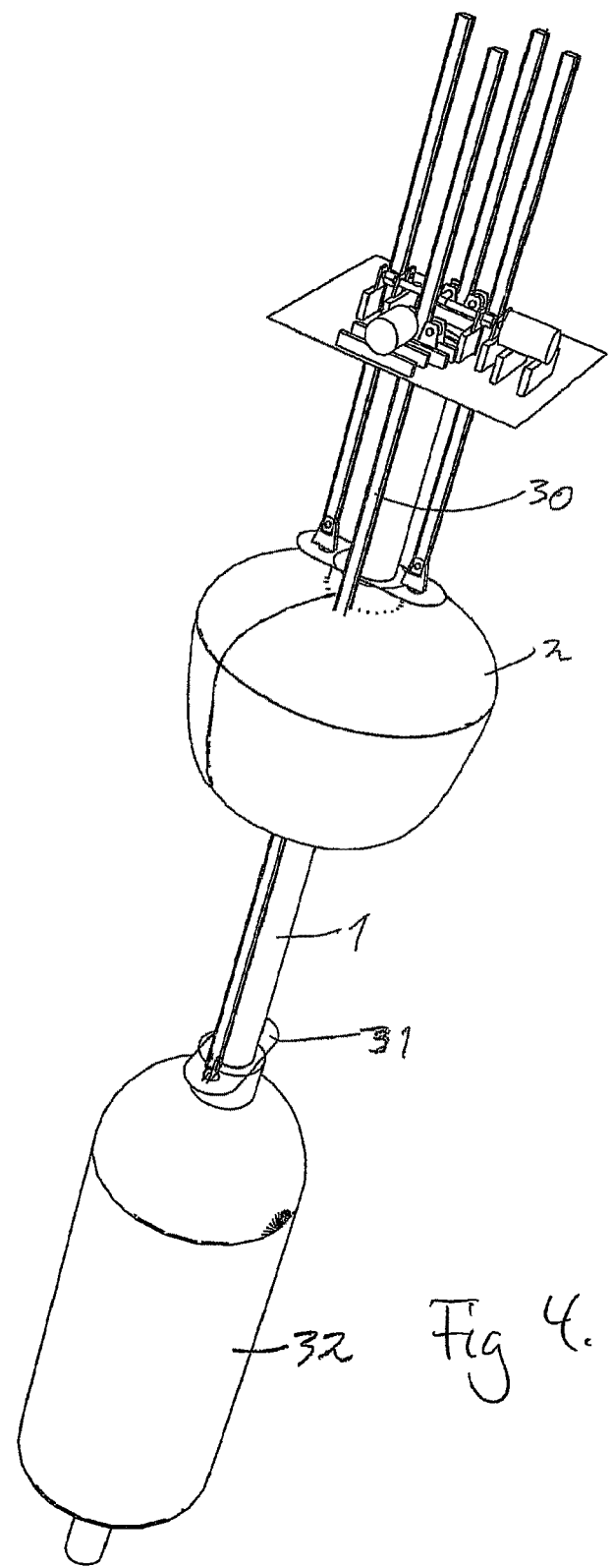
Figure 5:
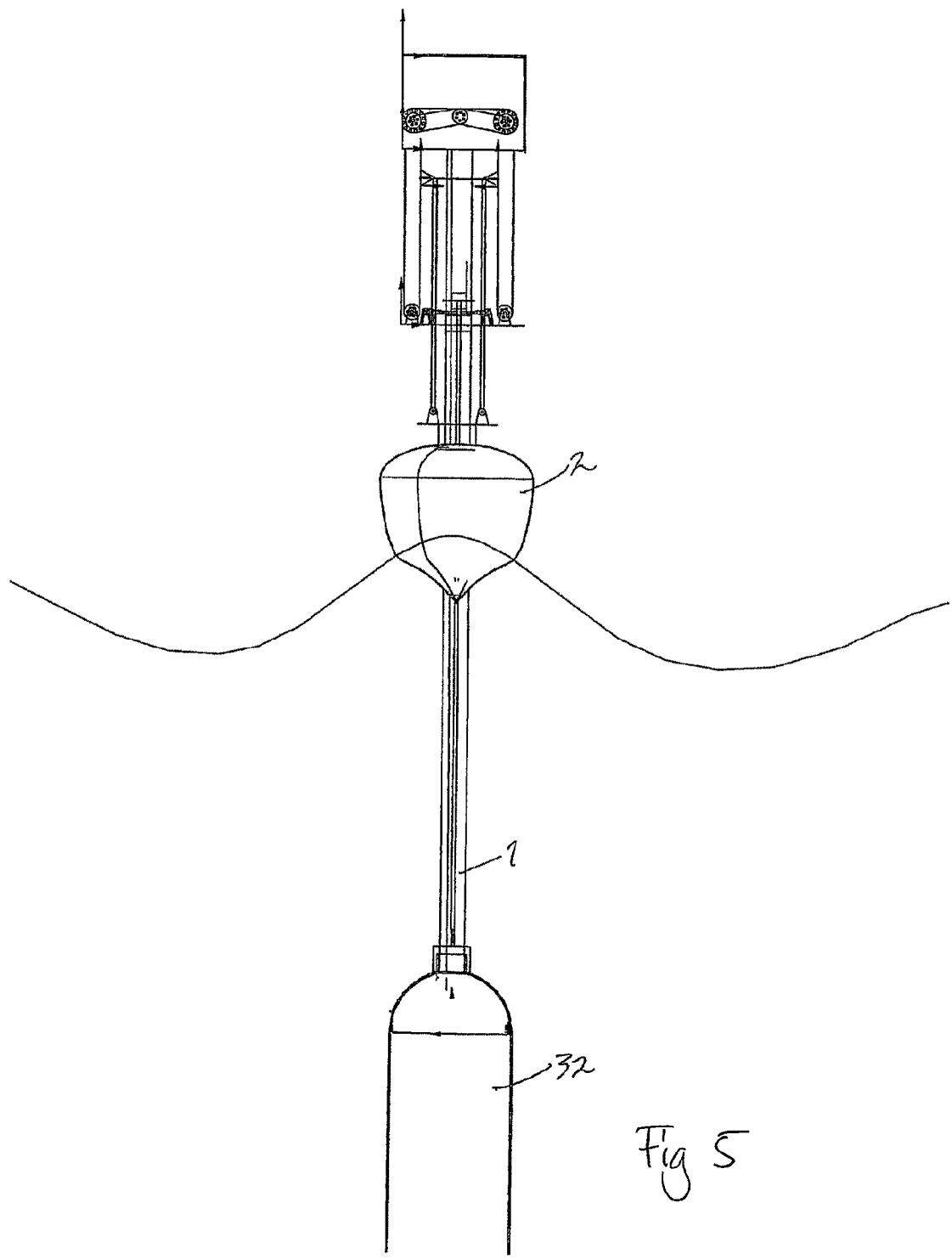
Figure 6:
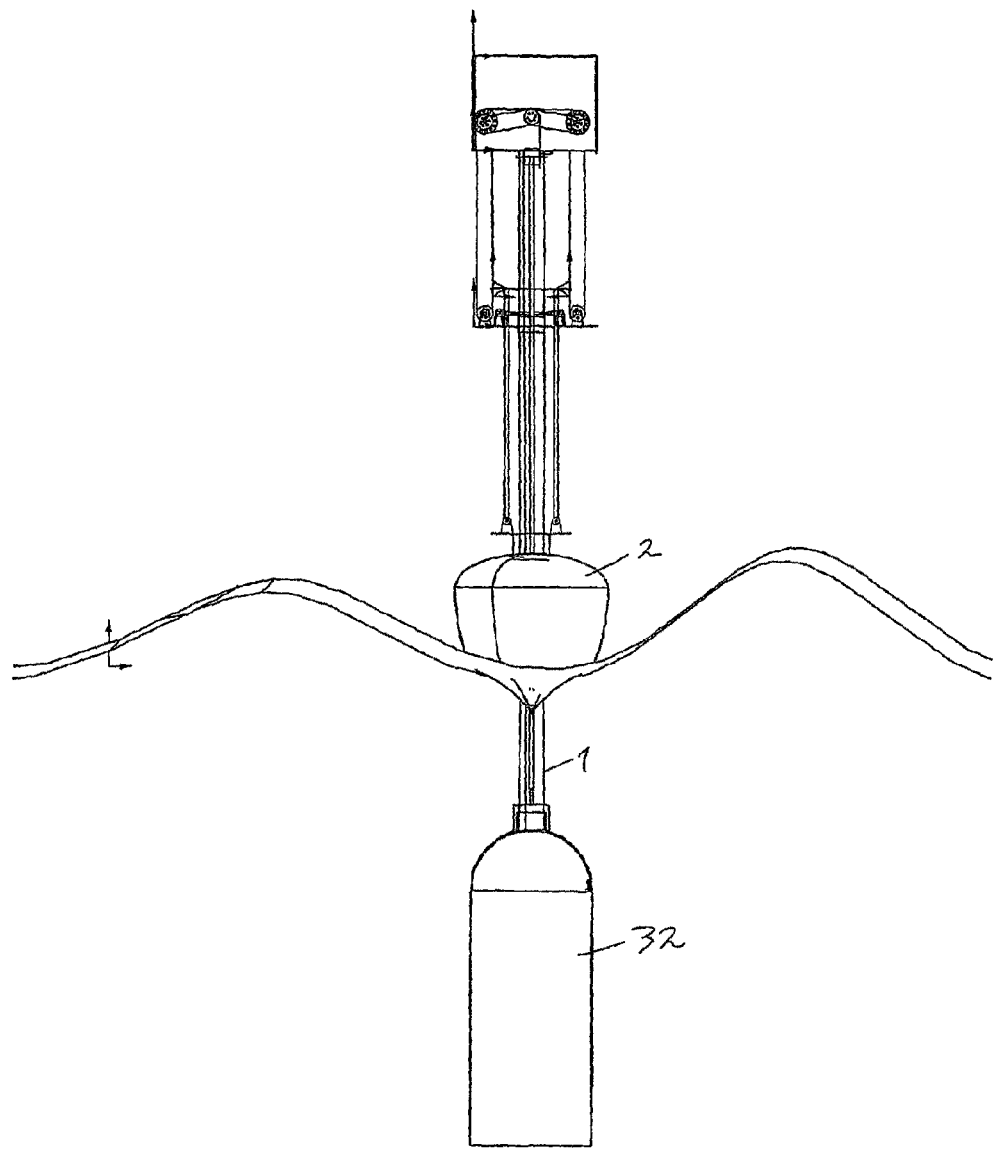
Figure 7:
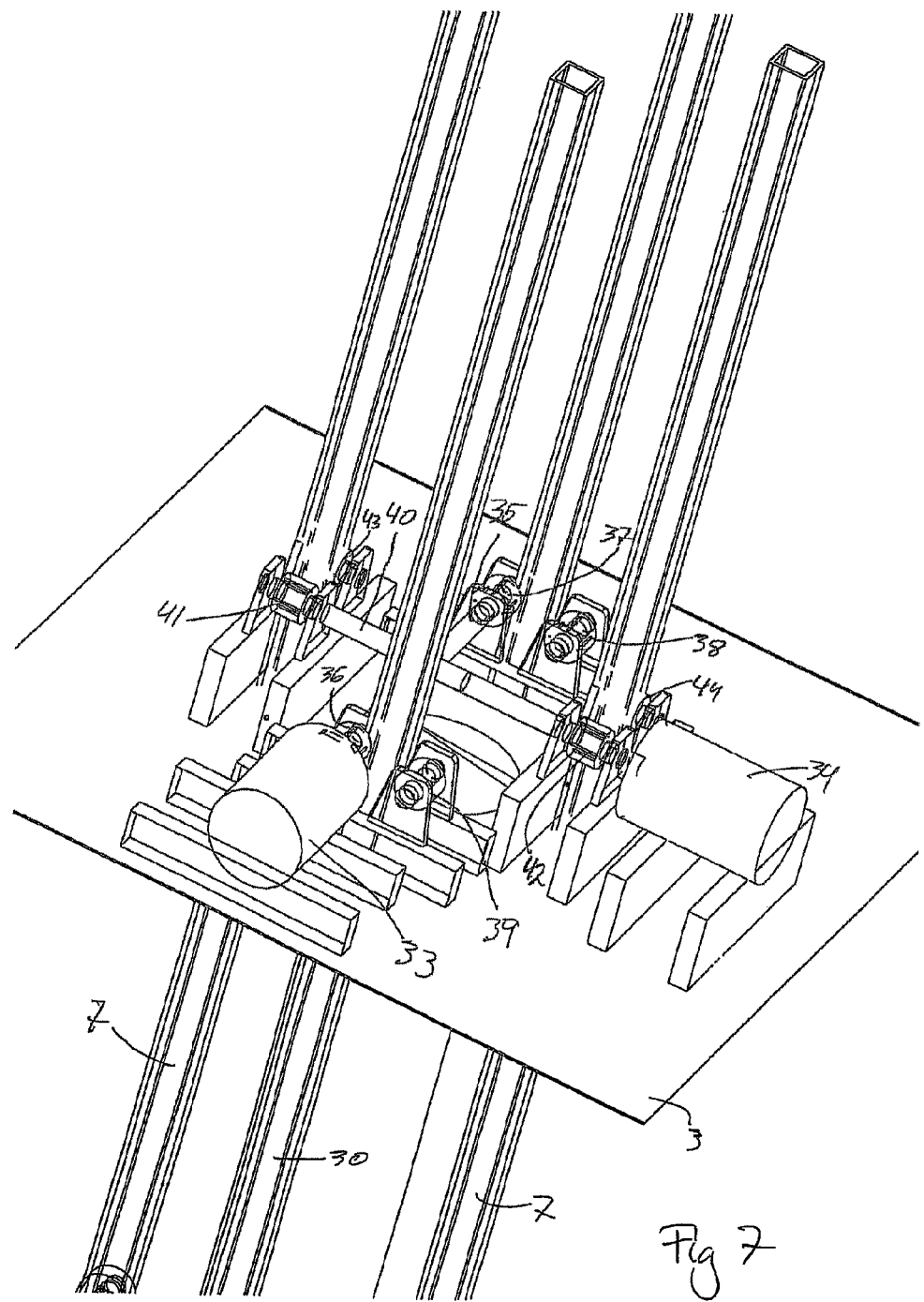
Figure 8:
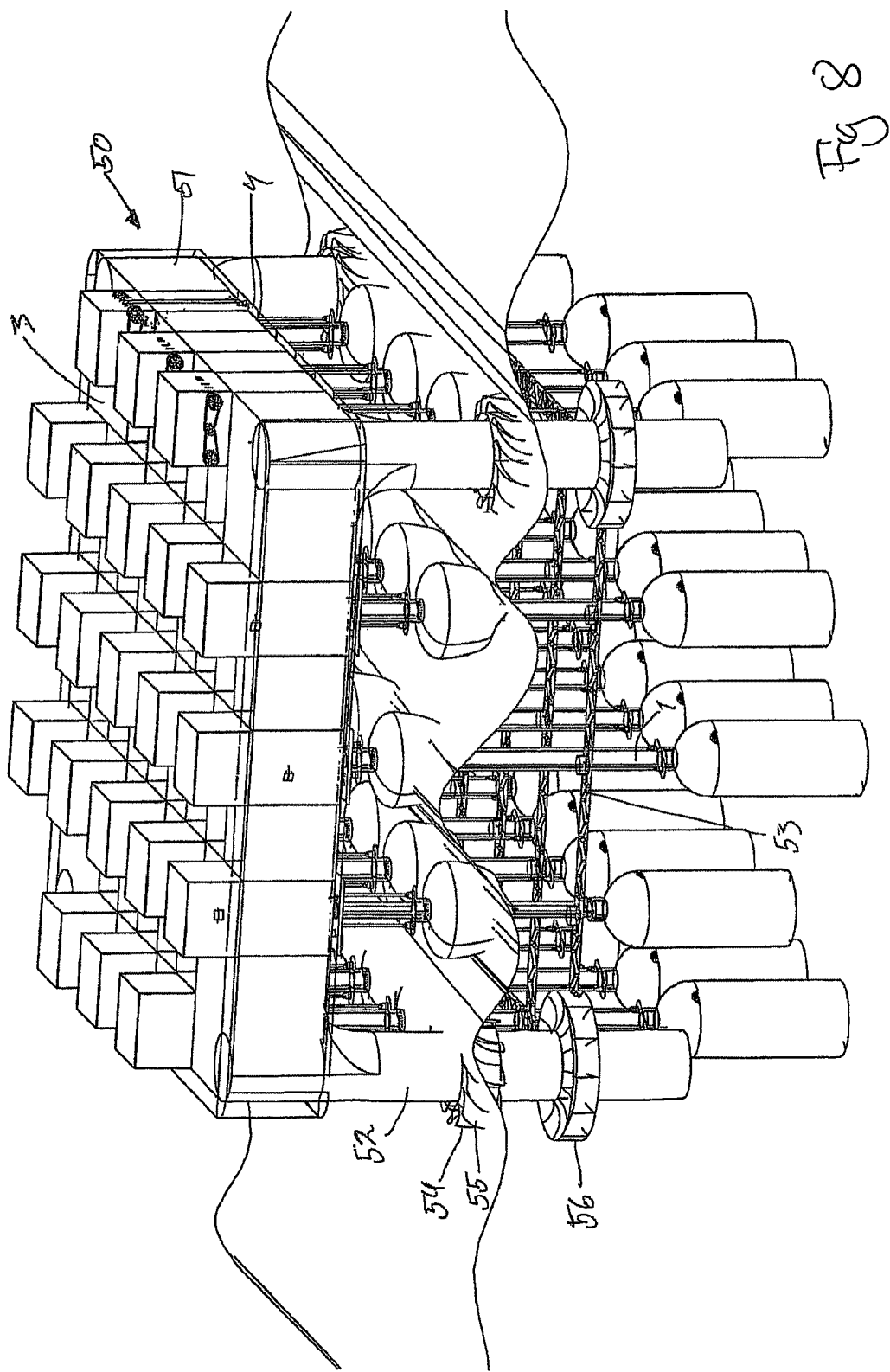

The invention will be explained further below by reference to the example embodiment shown in the enclosed drawings, where:

FIG. 1 shows a wave absorption device according to the invention in a first embodiment, FIG. 2 shows a modified floating body, FIG. 3 shows the floating body in FIG. 2 seen from below, FIG. 4 shows an alternative embodiment of the invention, FIG. 5 shows the embodiment in FIG. 4 when a wave crest is passing, FIG. 6 shows the embodiment in FIG. 4 when a trough of waves is passing, FIG. 7 shows a detail of the drive system according to the embodiment in FIG. 4, FIG. 8 shows a platform with several wave absorption devices according to the invention, and FIG. 9 shows a blade wheel for additional absorption of wave energy.

FIG. 1 shows a wave energy absorption device according to the invention. It comprises a guide rod 1 along which a floating body 2 can move. The guide rod 1 is a tube formed body which at its upper end is clamped to an upper deck 3. The guide rod 1 extends with a certain clearing through a lower deck 4. Four horizontal cylinders 5 are clamped between the lower deck 4 and the guide rod 1. The cylinders 5 stand in a right angle on each other. Thereby, the horizontal cylinders 5 can take up side forces which the guide rod 1 is influenced by from the waves. These side forces generate hydraulic pressure in the horizontal cylinders 5 that can be transformed to electrical energy by means of a not shown generator.

A first bracket 6 is arranged at the upper end of the floating body 2. Two linear rods 7 are attached to the bracket. The linear rods 7 are attached to a second bracket 8 at their upper ends. The second bracket 8 is slidable on the guide rod 1. The second bracket 8 is connected to two drive belts 9, 10, one on each side. The drive belts 9, 10 are led over respective lower re-control roller 11 (omstyrningsruller) and respective upper re-control roller 12a and 12b.

On each side of the upper re-control rollers 12, gear systems 13, 14, 15, 16 are arranged which the re-control rollers are attached to. The gear systems 13, 14, 15, 16 are attached to help rollers 17, 18. The gear systems 13, 14, 15, 16 are configured to transfer the rotation of the re-control rollers 12a, 12b to a rotation in the same direction independent of the rotational direction of the re-control rollers 12a, 12b. This is done by that when the floating body 2 is moving downwards the rotation of the re-control roller 12a, which is happening in the direction of the clock, is transferred to the gear system 13 and lead to rotation of the help roller in the direction of the clock. In addition, the rotation of the re-control roller 12b, that will be in the opposite direction of the clock, is transferred via the gear system 15 to the help roller 18 and lead to rotation of this in the opposite direction of the clock. The gear systems 14 and 16 will then function as a free wheel and not transfer any rotation.

When the floating body is moving upwards, the rotation from the re-control roller 12a will, which now will be in the opposite direction of the clock, be transferred via the gear system 16 to a rotation in the opposite direction of the clock by the help roller 18. The rotation of the re-control roller 12b, which is now rotating in the direction of the clock, will be transferred via the gear system 14 to a rotation in the direction of the clock by the help roller 17. The gear systems 13 and 15 will now run as free wheels.

In this way the help roller 17 will rotate in the direction of the clock all the time and the help roller 18 in the opposite direction of the clock. By arranging a flywheel (not shown) in the gear systems or on the help rollers one can get the help rollers 17, 18 to rotate with approximately constant speed even though the power supply happens intermittic. The load on the drive belts will be symmetric by the above mentioned configuration.

The rotational energy from the help rollers 17, 18 can be taken out on a not shown shaft from each of the help rollers 17, 18. The shaft can be connected to an electrical generator.

The lower re-control rollers 11 are preferably arranged on a horizontal movable bracket and connected to the guide rod 1.

When the floating body 2 is moving, for example upwards as a result of influence from a wave crest, the body 2 will be held back by that the generators are exposed to a load constituting in the order of 10% less than the upward directed force of the wave crests. Thereby, the floating body 2 will be held more submerged in the water than the buoyancy would require and the force that acts against the body 2 will thereby increase.

In the same way the floating body 2 can also be held back by downward directed movement with a force in the order of 10% less than the body's 2 effective weights (gravity minus buoyancy).

In the above mentioned WO 2004/113718 it is described in detail how such an attachment of a floating body can be done at a hydraulic system. However, in the hydraulic system described here the floating body will be held completely still under parts of the wave motion. However, with an electrical system it is simpler to control the force that the floating body is held back with. A person skilled in the art of current control will immediately understand how this should be done.

In FIG. 1 the floating body is shaped with a lower part that has gradually tampering diameter against the lower end 19. This shape causes the floating body to let the water go easier if it is moving completely out of the water and cuts easier down in the water when it moves back to the water again.

FIG. 2 shows an alternative floating body 2. This floating body 2 is equipped with vertical fins 20 extending along the surface of the floating body 2 from top to bottom. In FIG. 2, eight fins are shown extending orthogonal out from the floating body 2, but the number can be different from this. The width of the fins, measured from the surface of the floating body 2 to the outmost edge of the fins, can also be varied. However, the size of the fins will be limited by the weight, as the fines do not give net buoyancy to the floating body and thereby should not comprise a too large part of the weight.

The function of the fins 20 is to capture horizontal forces from the waves that act against the floating body. One has found that the horizontal wave forces can contain twice as much energy as the vertical wave forces. It is therefore an objective of the embodiment according to FIG. 2 to collect a larger part of these forces. Since the fins 20 stand out in several directions from the floating body 2, the waves will meet approximately the same area independent of which direction the waves have.

As seen from FIG. 3, the fins 20 have inclined side surfaces 21, 22 that function to deviate the water flow and reduce turbulence. Thereby one also will reduce the loss of force influence from the waves that arise because of turbulence.

The horizontal wave forces are transferred from the floating body 2 to the guide rod 1. Since the guide rod 1 is permitted to move slightly horizontal (approximately 100 mm measured at the lower deck 4) the forces will be further transferred to horizontal cylinders 5. From here, hydraulic energy can be taken out which in turn can be converted to electrical energy.

The vertical wave forces are transferred from the floating body to the linear rods 7 that move together with the floating body. Since the linear rods 7 are connected to the drive belts 9, 10 via the upper bracket 8 the vertical forces are transferred further to the drive belts 9, 10, and from these to the gear systems 13, 14, 15, 16. As mentioned above, rotational energy can be collected from the gear system, which in turn can be converted to electrical energy. The gear system has an exchange that increases the rotational velocity to a velocity that is optimal for the following electrical generator.

Chains, wires, straps or other flexible extended drive means can also be used in stead of drive belts.

To avoid transfer of large voltages from the guide rod 1 to the upper deck 3, the guide rod 1 is preferably flexible suspended in the upper deck 3, for example by a spherical layer (not shown). By going through the lower deck 4 it can be installed an elastic damper material that absorbs the forces from the guide rod 1 if the movement becomes so large that the horizontal cylinders 5 are not capable of absorbing all the forces. The same is valid for the linear rods 7 when they go through the lower deck 4, where it also can be installed an elastic damper material.

In an alternative embodiment, not shown in the figure, the drive belts 9, 10 and the gear systems 13, 14, 15, 16 can be replaced with linear generators directly connected to the linear rods 7 by that the stators are connected to the upper deck 3 and the linear rotators (in English also called "mover") are attached to the linear rods 7. The linear generators can transfer the linear kinetic energy directly to electrical energy.

Linear generators can here also be used in stead of the hydraulic horizontal cylinders 5.

It is preferably arranged for the floating body 2 to be brought completely out of the water under the vertical movement. Thereby the guide rod 1 will straighten up to vertical position due to the gravity so that even though the wave side forces only act in one direction the guide rod 1 will not be hanging out on the side.

FIG. 4 shows an alternative embodiment of the invention. Here it is an extra set of linear rods 30 extending through a tunnel in the floating body 2 and are connected with a bracket 31. The bracket 31 is in turn connected with a vessel in the shape of a cylinder 32 closed at its upper end and open at its lower end. The cylinder 32 is slidable on the guide rod 1.

The cylinder 32 is partially filled with water so that the upper part of the cylinder 32, close to the closed top, is filled with air. This cylinder 32 will move in anti-phase with the floating body 2 when the device is placed in the waves. FIG. 5 shows the device as it is passed by a wave crest. The floating body 2 is forced up by the wave crest. At the same time the pressure that acts on the air in the cylinder 32 will increase so that more water flows through the lower open end of the cylinder 32. Thereby the weight of the cylinder 32 will increase and the cylinder will sink in the water. FIG. 6 shows the device as it is passed by a trough of waves. In this case the cylinders' down diving depth will be reduced. Thereby the air in the cylinder will press out water from the cylinder and reduce the weight of the cylinder so that it rises in the water. The principle with this is the same that is used to get the hood to move in step with the waves according to U.S. Pat. No. 6,256,985.

FIG. 7 shows a detail of an alternative energy transmission device. This differs from the embodiment in FIG. 1 by that the linear rods 7 are led all the way up through the upper deck 3. This is also the linear rods 30, which are connected to the cylinder 32. Two generators 33, 34 are placed on the upper deck 3. The first generator 33 is attached to the linear rods 30 via a shaft 35, on which two wheels 36, 37 are arranged, which lies against a respective one of the linear rods 30. A respective support wheel 38, 39 is arranged on the opposite side of the linear rods 30.

The second generator 34 is attached to the linear rods 7 via a shaft 40, on which two wheels 41, 42 leaning against one of the respective linear rods 7 are arranged. A respective support wheel 43, 44 is arranged on the opposite side of the linear rods 7.

Each of the generators will be sat in rotation in the direction of the clock when the floating body 2, respectively cylinder 30 moves downwards and in the opposite direction of the clock when the floating body, respectively cylinder 30 moves upwards. It is thereby generated an electric current form each of the generators that alternates with the wave period. By means of conventional power control technique, this alternating current can be transformed to direct current or alternating current with a fixed frequency.

The previously described fixing of the floating body, and possibly also the cylinder 32, can be performed very simple by means of the generators 33 and 34. This can be secured against over load by the components by that the wheels 36-38 and 41-44 are allowed to skid towards the linear rods 7, 39 if the forces exceeds certain values.

The floating bodies 2 are preferably produced in a rubber material or a rubber like plastic material which is light and at the same time handles a certain amount of hits. For this, one can use the same material used in fenders. The cylinder 32 can be produced in steel or concrete. The cylinder 32 should have neutral buoyancy when it is half filled with water respectively air/gas and when there are no waves.

FIG. 8 shows a platform construction 50 that uses several wave absorption devices according to the FIGS. 5 and 6. In principle, the platform construction itself is the same as disclosed in WO/2004/113718, particularly FIG. 9, where the wave energy absorption devices are attached to a deck construction 51 comprising two decks 3 and 4 (in accordance with the decks 3 and 4 in the preceding). By each of the corners of the deck constructions 51, a leg 52 which is filled with air to give buoyancy is attached. The legs 52 are connected with each other by a frame work 53 at their lower end. The frame work is also intended to comprise a control for the guide rods 1 of the wave energy absorption devices. A damper device 56 is arranged at the lower ends of the legs 52, which can be shaped in the same way as described in WO/2004/113718.

A secondary wave energy absorption device 54 is arranged approximately on the middle of each leg 52. This consists of a blade wheel 55 rotateably supported on the leg 52. The blades of the blade wheel 55 can be curved, as shown in FIG. 8. Such a wave energy absorption device 54 will absorb energy from the waves independent of which direction they have. For further transmitting the energy the blade wheel 55 can be in connection with roller or similar placed between the blade wheel 55 and the leg 52, where the rollers in turn are in connection with a generator.

FIG. 9 shows an alternative embodiment of the blade wheel 55. In this embodiment the blade wheel 55 has straight blades 57, which however are curved abeam the length axis. The blades 57 are fastened between two rings 58 and 59 at a shaft extension 60 at each end of the inner long side of the blade 57. A pin 61 is arranged at each end of the outer long side of the blade 57, which is led in a track 62. Thereby, the blade can swing from one position, as shown by the blade 57a where the blade stands out from the leg 52, to a position shown by the blade 57b, where the blade lays approximately parallel with the surface of the leg 52. In the example shown in FIG. 8 the wave direction is shown by the arrow 63. The blades 57 located on the right side of the leg (seen in the direction of the arrow 63) will then lay out so that they extend out form the leg 52, while the blades 57 located on the left side of the leg 52 (seen in the direction of the arrow 63) will lay approximately parallel with the surface of the leg 52. Thus, the resistance from these blades will be reduced. The blade wheel 55 will thereby rotate in the opposite direction of the clock (seen from above) independently of the flow direction.

The blade wheel 55 is supported on a number of rollers 64, which in turn are rotatably supported on brackets 65 attached to the leg 52. A generator (not shown) can be arranged in connection with each roller 64.

The invention claimed is:

1. Device for absorption of wave energy, comprising: a floating body adapted to move as a result of influence from waves, and energy transmission device that transmits the movement of the floating body to a generator, and an immersed vessel containing gas in an upper part and water in a lower part, where the interior of the vessel has pressure communication with the surrounding water, so that the volume of the gas in the vessel depends on the pressure surrounding the vessel and thus affects the weight of the vessel and the content of the vessel, the vessel having such a connection to the rest of the device that the vessel moves mainly vertically and in anti-phase in relation to the vertical movement of the floating body when waves move past the device, and where the vessel is connected to an energy transmitting device that transmits the movement of the vessel to a generator.

2. Device according to claim 1, wherein the vessel is in a shape of a cylinder closed in its upper end and open in its lower end.

3. Device according to claim 1, wherein the vessel and the floating body are vertical slidable attached with a common guide rod.

4. Device according to claim 1, wherein the vessel is connected to energy transmitting device comprising linear rods.

5. Device according to claim 1, wherein the vessel is connected to the energy transmitting device comprising at least one drive belt.

6. Device according to claim 1, wherein separate gear systems are connected to each energy transmission device connected to the floating body, and when the floating body is moving upwards, rotation of a first re-control roller connected to a first energy transmission device in a first direction is transmitted via a first gear system to a first help roller for rotation in the first direction, at the same time as rotation of a second re-control roller in a second direction connected to a second energy transmission device is transferred via a second gear system to a second help roller for rotation in the second direction, and when the floating body is moving downwards the rotation of the first re-control roller in the second direction is transferred via a third gear system to the second help roller for rotation in the second direction, at the same time as rotation of the second re-control roller in the first direction is transferred via a fourth gear system to the first help roller for rotation in the first direction.

7. Device according to claim 1, wherein separate gear systems are connected to each energy transmitting device connected to the vessel, and when the vessel is moving downwards, the rotation of a first re-control roller connected to a first energy transmitting device in a first direction is transmitted via a first gear system to a first help roller for rotation in the first direction, at the same time as rotation of a second re-control roller in a second direction connected to a second energy transmitting device is transmitted via a second gear system to a second help roller for rotation in the second direction, and when the vessel is moving upwards, rotation of the first re-control roller in the second direction is transmitted via a third gear system to the second help roller for rotation in the second direction at the same time as rotation of the second re-control roller in the first direction is transmitted via a fourth gear system to the first help roller for rotation in the first direction.

8. Device according to claim 2, wherein the vessel and the floating body are vertical slidable attached with a common guide rod.

9. Device according to claim 2, wherein the vessel is connected to the energy transmitting device comprising linear rods.

10. Device according to claim 3, wherein the vessel is connected to the energy transmitting device comprising linear rods.

11. Device according to claim 2, wherein the vessel is connected to the energy comprising at least one drive belt.

12. Device according to claim 3, wherein the vessel is connected to the energy transmitting device comprising at least one drive belt.

13. Device according to claim 2, wherein separate gear systems are connected to each energy transmission device connected to the floating body, and when the floating body is moving upwards, rotation of a first re-control roller connected to a first energy transmission device in a first direction is transmitted via a first gear system to a first help roller for rotation in the first direction, at the same time as rotation of a second re-control roller in a second direction connected to a second energy transmission device is transferred via a second gear system to a second help roller for rotation in the second direction, and when the floating body is moving downwards, the rotation of the first re-control roller in the second direction is transferred via a third gear system to the second help roller for rotation in the second direction, at the same time as rotation of the second re-control roller in the first direction is transferred via a fourth gear system to the first help roller for rotation in the first direction.

14. Device according to claim 3, wherein separate gear systems are connected to each energy transmission device connected to the floating body, and when the floating body is moving upwards, rotation of a first re-control roller connected to a first energy transmission device in a first direction is transmitted via a first gear system to a first help roller for rotation in the first direction, at the same time as rotation of a second re-control roller in a second direction connected to a second energy transmission device is transferred via a second gear system to a second help roller for rotation in the second direction, and when the floating body is moving downwards, the rotation of the first re-control roller in the second direction is transferred via a third gear system to the second help roller for rotation in the second direction, at the same time as rotation of the second re-control roller in the first direction is transferred via a fourth gear system to the first help roller for rotation in the first direction.

15. Device according to claim 4, wherein separate gear systems are connected to each energy transmission device connected to the floating body, and that when the floating body is moving upwards, rotation of a first re-control roller connected to a first energy transmission device in a first direction is transmitted via a first gear system to a first help roller for rotation in the first direction, at the same time as rotation of a second re-control roller in a second direction connected to a second energy transmission device is transferred via a second gear system to a second help roller for rotation in the second direction, and when the floating body is moving downwards, the rotation of the first re-control roller in the second direction is transferred via a third gear system to the second help roller for rotation in the second direction, at the same time as rotation of the second re-control roller in the first direction is transferred via a fourth gear system to the first help roller for rotation in the first direction.

16. Device according to claim 5, wherein separate gear systems are connected to each energy transmission device connected to the floating body, and that when the floating body is moving upwards, rotation of a first re-control roller connected to a first energy transmission device in a first direction is transmitted via a first gear system to a first help roller for rotation in the first direction, at the same time as rotation of a second re-control roller in a second direction connected to a second energy transmission device is transferred via a second gear system to a second help roller for rotation in the second direction, and when the floating body is moving downwards, the rotation of the first re-control roller in the second direction is transferred via a third gear system to the second help roller for rotation in the second direction, at the same time as rotation of the second re-control roller in the first direction is transferred via a fourth gear system to the first help roller for rotation in the first direction.

17. Device according to claim 6, wherein separate gear systems are connected to each energy transmission device connected to the floating body, and when the floating body is moving upwards, rotation of a first re-control roller connected to a first energy transmission device in a first direction is transmitted via a first gear system to a first help roller for rotation in the first direction, at the same time as rotation of a second re-control roller in a second direction connected to a second energy transmission device is transferred via a second gear system to a second help roller for rotation in the second direction, and when the floating body is moving downwards, the rotation of the first re-control roller in the second direction is transferred via a third gear system to the second help roller for rotation in the second direction, at the same time as rotation of the second re-control roller in the first direction is transferred via a fourth gear system to the first help roller for rotation in the first direction.

18. Device according to claim 2, wherein separate gear systems are connected to each energy transmitting device connected to the vessel, and when the vessel is moving downwards, the rotation of a first re-control roller connected to a first energy transmitting device in a first direction is transmitted via a first gear system to a first help roller for rotation in the first direction, at the same time as rotation of a second re-control roller in a second direction connected to a second energy transmitting device is transmitted via a second gear system to a second help roller for rotation in the second direction, and when the vessel is moving upwards, rotation of the first re-control roller in the second direction is transmitted via a third gear system to the second help roller for rotation in the second direction at the same time as rotation of the second re-control roller in the first direction is transmitted via a fourth gear system to the first help roller for rotation in the first direction.

19. Device according to claim 2, wherein separate gear systems are connected to each energy transmitting device connected to the vessel, and when the vessel is moving downwards, the rotation of a first re-control roller connected to a first energy transmitting device in a first direction is transmitted via a first gear system to a first help roller for rotation in the first direction, at the same time as rotation of a second re-control roller in a second direction connected to a second energy transmitting device is transmitted via a second gear system to a second help roller for rotation in the second direction, and when the vessel is moving upwards, rotation of the first re-control roller in the second direction is transmitted via a third gear system to the second help roller for rotation in the second direction at the same time as rotation of the second re-control roller in the first direction is transmitted via a fourth gear system to the first help roller for rotation in the first direction.

20. Device according to claim 3, wherein separate gear systems are connected to each energy transmitting device connected to the vessel, and when the vessel is moving downwards, the rotation of a first re-control roller connected to a first energy transmitting device in a first direction is transmitted via a first gear system to a first help roller for rotation in the first direction, at the same time as rotation of a second re-control roller in a second direction connected to a second energy transmitting device is transmitted via a second gear system to a second help roller for rotation in the second direction, and when the vessel is moving upwards, rotation of the first re-control roller in the second direction is transmitted via a third gear system to the second help roller for rotation in the second direction at the same time as rotation of the second re-control roller in the first direction is transmitted via a fourth gear system to the first help roller for rotation in the first direction.

* * * * *